UNITED STATES PATENT OFFICE.

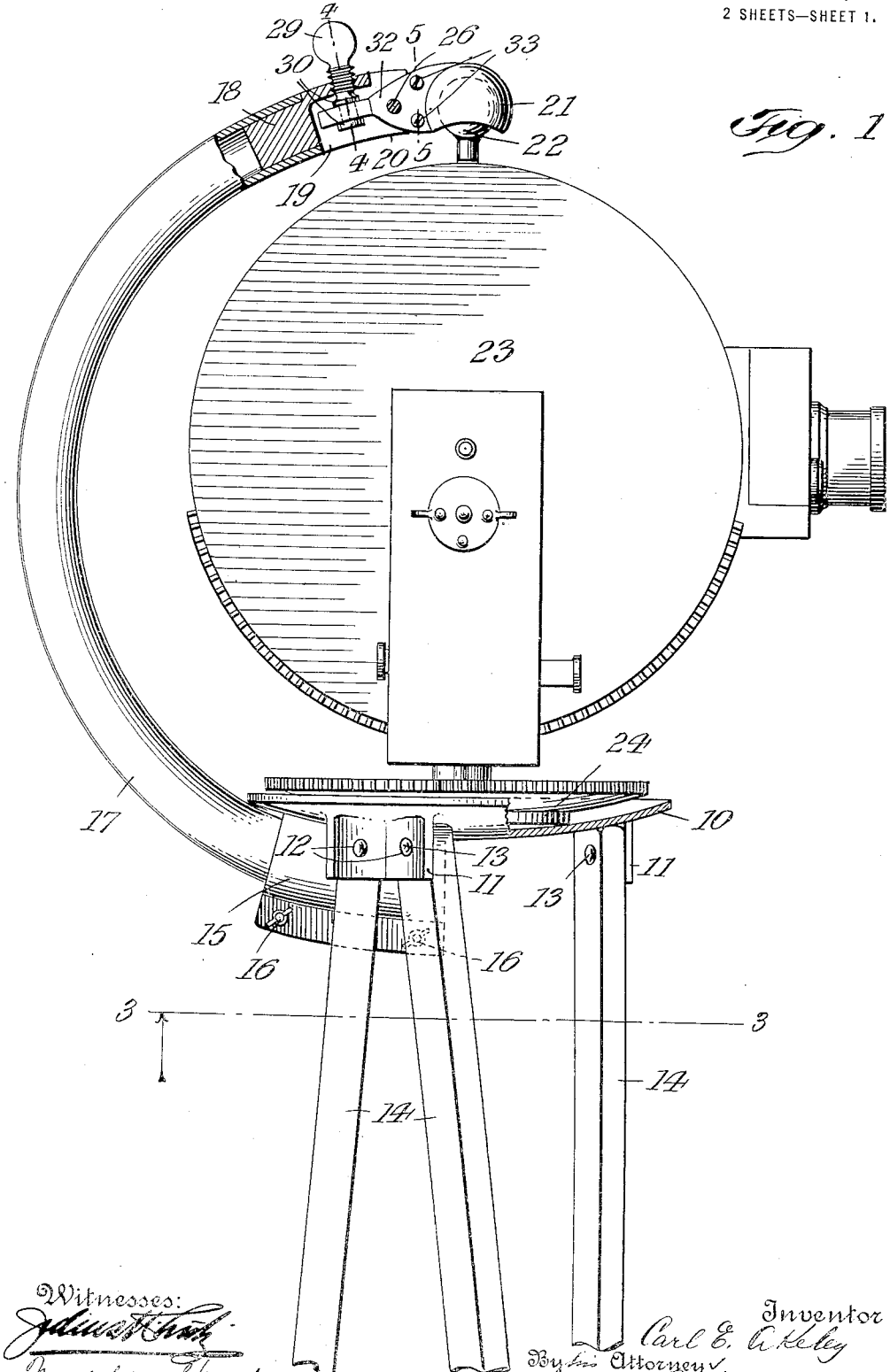

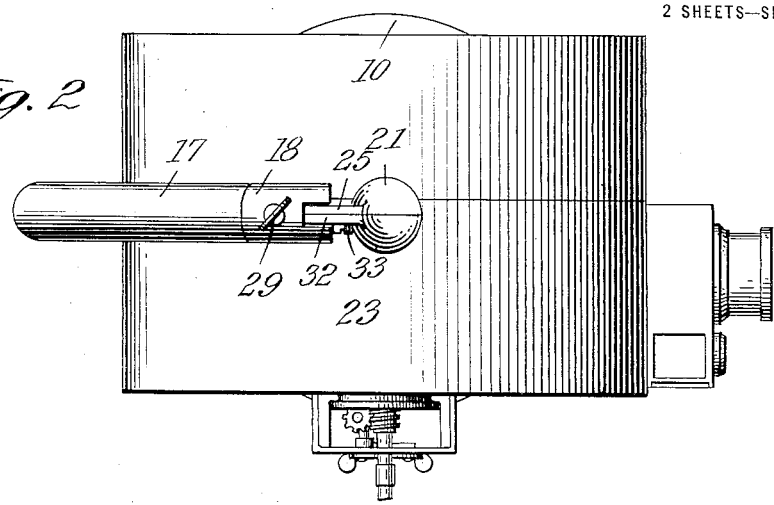
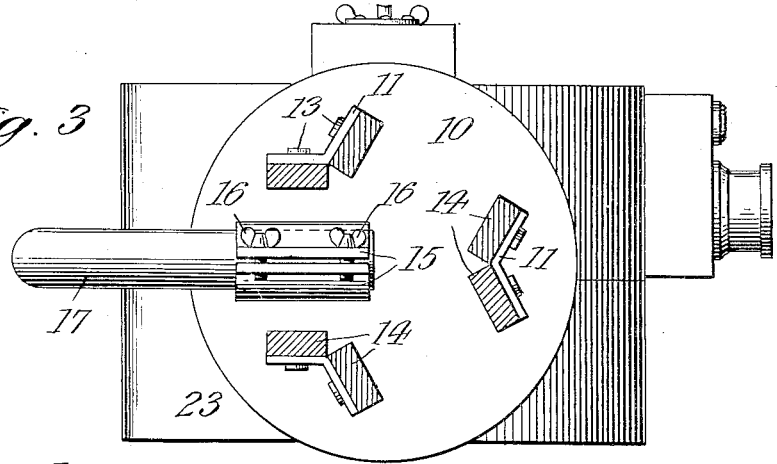
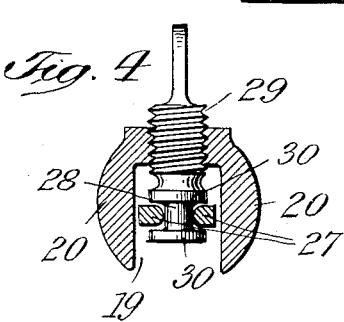
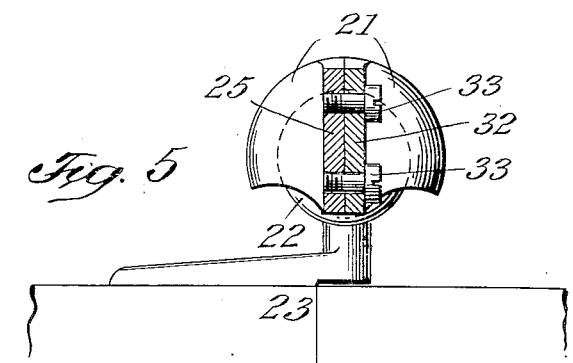
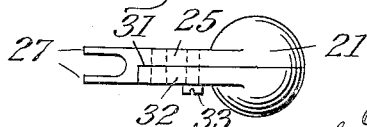

CARL E. AKELEY, OF NEW YORK, N. Y., ASSIGNOR TO AKELEY CAMERA, INC., OF NEW YORK, N. Y., A CORPORATION OF NEW YORK.

CAMERA-STAND.

1,173,401.  Specification of Letters Patent.  Patented Feb. 29, 1916.

Application filed August 3, 1914, Serial No. 854,775. Renewed June 15, 1915, Serial No. 34,302.

*To all whom it may concern:*

Be it known that I, CARL E. AKELEY, a citizen of the United States, and residing in the city of New York, county and State of New York, have invented certain new and useful Improvements in Camera-Stands, of which the following is a specification.

This invention relates to a novel stand for cameras and more particularly for moving picture cameras such as disclosed in a co-pending patent application filed by me on even date herewith. The stand is so constructed that the camera will automatically adjust itself to a true horizontal position whereupon it may be readily clamped in position. My invention also comprises other novel features of construction as more fully brought out in the appended specification and claims.

In the accompanying drawing: Figure 1 is a sectional side elevation of a stand embodying my invention, showing the camera in position; Fig. 2 a top view of Fig. 1; Fig. 3 a cross section on line 3—3, Fig. 1, looking upward; Fig. 4 an enlarged cross section on line 4—4, Fig. 1; Fig. 5 a similar section on line 5—5, Fig. 1, and Fig. 6 a top view of the socket.

The numeral 10 indicates a circular dished base plate having a number of downwardly extending angular lugs 11, the drawing showing three of such lugs. Into perforations 12 of the latter are adapted to be sprung the pins 13 of the upper shanks 14 of the usual tripod legs. Intermediate two of the lugs 11, plate 10 is provided at its lower side with a bipartite clamp 15 the two portions of which may be drawn by screws 16 against the lower end of a bail or curved arm 17 so as to securely hold the latter in position. Into the upper end of arm 17 is tightly fitted a plug 18 recessed as at 19 to form a pair of cheeks 20. To the latter is adjustably secured a substantially globular socket 21 adapted to receive the ball or knob 22 of a moving picture camera 23, which rests with an annular rim 24 on dished plate 10. Socket 21 is provided with a shank 25 that is loosely mounted upon a pin 26 connecting cheeks 20. At its rear end, shank 25 is forked as at 27 and here straddles the reduced shank 28 of a thumb screw 29 between a pair of collars 30, said screw being tapped into plug 18. In order to permit a ready removal of the camera from the stand, socket 21 is made bipartite, for which purpose shank 25 is recessed as at 31 to accommodate the comparatively short shank 32 of the removable socket-moiety, the shanks 25, 32 being connected by screws 33.

In practice, knob 22 should be located above the center of gravity of camera 23 in such a manner that when said camera is freely suspended from socket 21, it will automatically occupy a perpendicular position, *i.e.* the annular rim 24 will extend in a horizontal plane. The concave upper face of plate 10 furthermore should form part of a globe the center of which coincides with that of socket 21.

While setting up the stand care need not be taken that plate 10 extends in a horizontal position as is the case with the stands hitherto generally employed. After the stand has thus been set up, thumb screw 29 is so manipulated that the camera 23 is freely suspended from socket 21, so as to automatically occupy its proper horizontal position. Screw 29 is then tightened to securely clamp rim 24 to plate 10 and thus fix the camera in position.

I claim:

1. A camera stand comprising a base plate, an arm extending upwardly therefrom, means for suspending a camera from said arm, and means for operating said suspending means to clamp said camera to the base plate.

2. A camera stand comprising a dished base plate, an arm extending upwardly therefrom, and a socket adjustably secured to said arm.

3. A camera stand comprising a dished base plate, a arm clamped to the lower face of said plate, and a socket adjustably secured to said arm.

4. A camera stand comprising a dished base plate, an arm extending upwardly therefrom, a socket pivoted to said arm, and means for setting said socket.

5. A camera stand comprising a dished base plate, an arm extending upwardly therefrom, a socket pivoted to said arm, and a screw on the arm for adjusting said socket.

6. A camera stand comprising a dished base plate, an arm extending upwardly therefrom, a recessed plug fitted to the upper end of said arm, a socket having a pivoted shank that is accommodated within the plug-recess, and a screw tapped into said plug and engaging the socket-shank.

7. A camera stand comprising a base plate, angular lugs depending therefrom, legs adapted to be secured to said lugs, a clamp also depending from the base plate, a curved upwardly extending arm engaged by the clamp, means for suspending a camera from said arm, and means for operating said suspending means to clamp the camera to the base plate.

8. A camera stand comprising a dished base plate, an arm extending upwardly therefrom, a recessed plug fitted to the upper end of said arm, a bipartite socket having a pivoted shank that is accommodated within the plug-recess, and a screw tapped into said plug and engaging the socket-shank.

9. Mounting for a motion picture camera comprising means for freely suspending a camera, a base below the camera, and means for varying the distance between said camera-suspending means and base whereby the camera is either freed or fixed in position.

10. Mounting for a motion picture camera, comprising a base, a curved arm extending upwardly from said base, means on said arm for freely suspending the camera therefrom, and manually operable means for varying the distance between said camera-suspending means and base whereby the camera is either freed or fixed in position.

CARL E. AKELEY.

Witnesses:
ARTHUR E. ZUMPE,
MADELINE HIRSCH.